US012664441B2

(12) United States Patent
Sghiouer

(10) Patent No.: US 12,664,441 B2
(45) Date of Patent: Jun. 23, 2026

(54) METHOD AND SYSTEM FOR IDENTIFYING RELEVANT VARIABLES

(71) Applicant: BULL SAS, Les Clayes-sous-Bois (FR)

(72) Inventor: Kaoutar Sghiouer, Compiegne (FR)

(73) Assignee: BULL SAS, Les Clayes-Sous-Bois (FR)

( * ) Notice: Subject to any disclaimer, the term of this patent is extended or adjusted under 35 U.S.C. 154(b) by 1177 days.

(21) Appl. No.: 17/136,598

(22) Filed: Dec. 29, 2020

(65) Prior Publication Data

US 2021/0201164 A1      Jul. 1, 2021

(30) Foreign Application Priority Data

Dec. 31, 2019    (FR) ...................................... 1915809

(51) Int. Cl.
| | |
|---|---|
| *G06N 3/126* | (2023.01) |
| *G05B 23/02* | (2006.01) |
| *G06F 17/15* | (2006.01) |
| *G06N 20/00* | (2019.01) |
| *G06Q 30/0241* | (2023.01) |
| *H04L 9/40* | (2022.01) |

(52) U.S. Cl.
CPC ......... *G06N 3/126* (2013.01); *G05B 23/0283* (2013.01); *G06F 17/15* (2013.01); *G06N 20/00* (2019.01); *G06Q 30/0248* (2013.01); *H04L 63/1416* (2013.01)

(58) Field of Classification Search
CPC .......... G06N 3/126; G06N 20/00; G06N 3/00; G06N 5/00; G06N 7/00; G06N 99/00
See application file for complete search history.

(56) References Cited

U.S. PATENT DOCUMENTS

| | | | |
|---|---|---|---|
| 2005/0114369 A1 | 5/2005 | Gould et al. | |
| 2005/0197987 A1* | 9/2005 | Anderson .............. | G06N 3/126 |
| | | | 706/45 |
| 2019/0034461 A1* | 1/2019 | Flinsenberg ........ | H03M 7/3059 |

OTHER PUBLICATIONS

Xu, K., Li, Y., Liu, C. et al. Advanced Data Collection and Analysis in Data-Driven Manufacturing Process. Chin. J. Mech. Eng. 33, 43 (2020). https://doi.org/10.1186/s10033-020-00459-x (Year: 2020).*
Kravchik, Moshe & Shabtai, Asaf. (2018). Detecting Cyber Attacks in Industrial Control Systems Using Convolutional Neural Networks. 72-83. https://doi.org/10.1145/3264888.3264896 (Year: 2018).*

(Continued)

*Primary Examiner* — Kakali Chaki
*Assistant Examiner* — Johnathan R Germick
(74) *Attorney, Agent, or Firm* — ARC IP Law, PC; Joseph J. Mayo

(57) ABSTRACT

The invention relates to a method for identifying variables relevant to a dataset, said variables being derived from a plurality of variables involved in processing the dataset, said method comprising:
- a step of generating a subset of variables from the plurality of variables,
- a step of assigning a quantization value to each variable of the generated subset of variables,
- a step of selecting a relevant variable,
- a further step of generating a new subset of variables when the quantitative value of the selected variable is below a predetermined threshold value.

11 Claims, 4 Drawing Sheets

(56) References Cited

OTHER PUBLICATIONS

İ. Karakurt, S. Özer, T. Ulusinan and M. C. Ganiz, "A machine learning approach to database failure prediction," 2017 International Conference on Computer Science and Engineering (UBMK), Antalya, Turkey, 2017, pp. 1030-1035, doi: 10.1109/UBMK.2017. 8093426. (Year: 2017).*

Babatunde, O. H., Armstrong, L. , Leng, J. , & Diepeveen, D. (2014). A Genetic Algorithm-Based Feature Selection. International Journal of Electronics Communication and Computer Engineering, 5(4), 899-905 (Year: 2014).*

Li, J., Cheng, K., Wang, S., Morstatter, F., Trevino, R., Tang, J., & Liu, H. (2017). Feature Selection: A Data Perspective. ACM Comput. Surv., 50(6). (Year: 2017).*

Gupta, S., Dileep, A.D. & Gonsalves, T.A. A joint feature selection framework for multivariate resource usage prediction in cloud servers using stability and prediction performance. J Supercomput 74, 6033-6068 (2018). https://doi.org/10.1007/s11227-018-2510-7 (Year: 2018).*

Grohmann, J., Nicholson, P., Iglesias, J., Kounev, S., & Lugones, D. (2019). Monitorless: Predicting Performance Degradation in Cloud Applications with Machine Learning. In Proceedings of the 20th International Middleware Conference (pp. 149-162). Association for Computing Machinery. (Year: 2019).*

Search Report issued in EP20218022.0 on Feb. 22, 2021 (6 pages).

Pedregosa et al., "Scikit-learn: Machine Learning in Python", Journal of Machine Learning Research 12 (2011) pp. 2825-2830.

McKinney, "pandas: a Foundational Python Library for Data Analysis and Statistics", 2011, 9 pages.

Kandel, "Designer Cloud Powered by Trifacta", TRIFACTA, 2011, retrieved from https://www.trifacta.com/products/.

Verborgh et al., "Using OpenRefne", PACKT Publishing, 2013.

Wickham, "ggplot2 Elegant Graphics for Data Analysis", Second Edition, Springer, 2016.

Search Report issued in corresponding French application FR 1915809 dated Jul. 21, 2020, 2 pages.

Abedjan, et al. "Profiling Relational Data: A Survey." The VLDB Journal. vol. 24. No. 4, pp. 557-581. Jun. 2, 2015.

Chiang, et al. "Linear Correlation Discovery in Databases: a Data Mining Approach." Data & Knowledge Engineering. vol. 53., No. 3, pp. 311-337. Oct. 19, 2004.

* cited by examiner

100

400 — Selecting at least one relevant variable

610 — Calculating correlation

620 — Encoding variables

630 — Calculating a fit value

640 — Generating a new variable

641 — Selecting variables

642 — Transforming variables

650 — Calculating a fit value

660 — Comparison — NOK

OK

670 — Generation

Lower fit — NOK — OK — END

METHOD AND SYSTEM FOR IDENTIFYING RELEVANT VARIABLES

The invention relates to the field of data analysis, and more particularly to the identification of variables for a dataset, which can be used in particular subsequently for advanced data modeling or exploitation phases. The invention relates to a method for identifying variables relevant to a dataset as well as to a system for identifying variables relevant to a dataset. The invention also relates to a variable selection module for identifying variables relevant to a dataset.

PRIOR ART

With the expansion of activities related to Big Data, the Data Scientist business has grown significantly in recent years. This business, which aims at taking advantage of the large amounts of data available in companies and large organizations, is based on a variety of statistical techniques and computer tools, but remains largely "home-made" today. Each organization and each dataset pose specific problems to which Data Scientists try to respond with "tailor-made" solutions.

This is due in particular to the very great heterogeneity of the available data, their often incomplete nature and the errors and inconsistencies contained in almost all datasets of significant size. In order to take these aspects into account, Data Scientists, before entering into advanced data modeling and exploitation phases, must first go through a phase of preprocessing and preliminary analysis of the data (cleaning, exploratory analysis). However, these tasks are extremely cumbersome and time-consuming. Thus, as highlighted in the study conducted by Forbes in 2016 and relayed in the article by G. PRESS, the Data Scientist spends 80% of his/her time on this process of data preprocessing and analysis and only 20% in pure algorithmics.

The data preprocessing and preliminary analysis phase accounts for a considerable part of the work of Data Scientists, which today relies essentially on the non-automated and/or systematized implementation of different tools, and without a federating framework for an easy and relevant comparison of the results obtained on a dataset following the application of different analysis techniques.

In 2011, the work of S. KANDEL et al. led to the development of the Wrangler tool, and then to the creation of the Trifacta company, which is developing a high performance preprocessing tool [KANDEL, 2011]. Nevertheless, this tool only makes it possible to facilitate textual type processing (use of regular expressions for example); to exploit data from databases (breakdowns, column groupings, etc.); to analyze messages syntactically.

It is in fact compared and evaluated in terms of time to the same processing carried out by Excel. Thus, it is only a tool for preprocessing raw data, but it is not able to perform statistics on the processed data. Precisely for this reason, the authors conclude in their perspectives that it is worthwhile to include other analytical techniques, including statistical techniques.

The open source program OpenRefine, developed by Google, is described in particular by R. Verborgh and M. De Wilde [VERBORGH, 2013]. However, it is a tool for processing unstructured data, in order to clean it and convert it from one format to another. Again, the tool does not perform any statistical analysis of the injected data.

The R language allows to perform statistical calculations and also to develop Machine Learning applications. It integrates numerous modules that allow the Data Scientist to easily perform this type of processing as well as preprocessing of data. It thus allows: data manipulation, via numerous data manipulation libraries; data visualization, a technique implemented in the ggplot2 tool for example presented by W. HADLEY [HADLEY, 2016]. This allows to build a set of geometric objects ("geoms") from a restricted dataset. However, there is no easy-to-use interface other than the programming language itself, which is fast and accessible, allowing any user, whether or not they are computer-literate, to implement supervised or unsupervised learning techniques.

Like the R language, the Python language is very widespread in the scientific world and has libraries dedicated to data analysis, notably: Pandas, which facilitates data manipulation, via adapted data structures and cleaning, formatting or other preprocessing operations [MCKINNEY, 2011]; Scikit-learn (sometimes abbreviated to sklearn), which provides different classification, regression and clustering algorithms for statistical analysis [PEDREGOSA, 2011].

However, depending on the values to be processed, the algorithms do not behave in the same way and this affects the result they output. When several estimation methods are a priori relevant, it is therefore not guaranteed that they provide the same result. From this point of view, it would seem useful to have methods or tools for comparing the relevance of the test results of each method.

As mentioned, machine learning is a major part of the fourth industrial revolution. Thus, industrial processes are more and more frequently improved through the integration of artificial intelligence or, more specifically, machine learning models capable of addressing technical problems as varied as there are industrial processes.

In particular, machine learning is based on a multitude of data that can come from several different sources and can therefore be highly heterogeneous. Thus, with the methods of the prior art, it is common for a team of data scientists to be trained in data processing and set up data processing processes. Nevertheless, when data sources are diverse and vary over time, the prior art methods are not reactive and can cause shutdowns of industrial processes. Indeed, when machine learning is used for industrial process control, a non-adapted preprocessing of this multitude of data sources can lead to a decrease in the responsiveness of control processes or worse a lack of sensitivity.

The overall conclusion is that there is a lack of tools capable of performing preprocessing tasks and analysis tasks in an automated/systematic manner. In fact, the tools of the prior art are limited to very basic data preprocessing (formatting, adding columns, etc.), without being concerned about the resulting analysis, making them time-consuming to use. In addition, it thus seems useful to have a tool that allows the most relevant variables for a dataset to be identified during the analysis. It is therefore necessary to develop methods and systems that are less time-consuming than existing ones, simpler to use and automated and/or systematized, and that can support a large amount of data as well as heterogeneous data.

Indeed, there is a risk that a same dataset may be interpreted differently by several techniques, which then provide divergent results, as the degree of complexity of the analysis increases. This complexity of analysis may be due to: the volume of the dataset; samples from a same population that may be random or missing; contained errors or inconsistencies. It then becomes essential to be able to assess the relevance of the results provided by the analysis techniques following their application to the dataset.

However, in the context of the use of predictive models trained via learning techniques, the appearance of new variables or the modification of variables over time, not taken into account by the predictive model used, often makes the prediction model obsolete. Indeed, since the selected predictive model is based on probability laws that allow a dataset to be interpreted, the addition, deletion or change of variables, not taken into account by the prediction model, often requires a redesign of the prediction model, which is often time-consuming. A prediction model that is no longer suitable will therefore not be able to anticipate the appearance of anomalies, such as breakdowns or resource requirements in the context of predictive maintenance of IT infrastructures such as High-Performance Computing systems. Considering data as outliers or characteristic of an anomaly in a dataset in connection with a misinterpretation of the dataset in the field of cyber security or more generally of surveillance is particularly important since it allows the detection of attacks or fraud. However, no existing solution allows for the direct and simultaneous comparison of correlation results of datasets according to several analysis techniques. Similarly, at present, there is no solution that offers to automatically process the datasets, especially in the context of an application to industrial processes, and to provide the user with the most appropriate implemented method to interpret the dataset and correlate the variables. It is therefore up to the user to analyze all the results provided by the different methods in order to draw conclusions and choose the interpretation that seems to correspond most closely to the dataset under study.

Finally, the solutions of the state of the art are not very accessible, following a "black box" logic. They are primarily intended for Data Science experts, either: for carrying out all the preprocessing steps, or for interpreting/understanding the results obtained following correlation tests. The tools therefore do not explain to the user why the correlation between an analytical method and a dataset has succeeded or failed. In addition, some tools require knowledge/mastery of programming and computer languages to be manipulated.

TECHNICAL PROBLEM

The invention therefore aims to overcome the disadvantages of the prior art. In particular, the invention aims at providing a method for identifying variables relevant to a dataset, said method being fast and simple to implement, with a reduced number of steps, allowing the reliability and relevance of the selected variables to be controlled while being simple to use, automated, systematized and allowing easy application to any industrial process. Said method is also accessible to any user while being able to support a large amount of data, which may be heterogeneous. Moreover, it is particularly suitable for the monitoring of industrial processes and more particularly of information systems.

The invention further aims at providing a system for identifying variables relevant to a dataset, said system being simple and fast to use. In addition, the system according to the invention is accessible and capable of processing a large volume of data. The system according to the invention also allows the reliability and relevance of the selected variables to be controlled.

BRIEF DESCRIPTION OF THE INVENTION

For this purpose, the invention relates to a method for identifying relevant variables in a dataset including a plurality of data subsets implemented by a computing device, each of the data subsets corresponding to a variable so as to form a set of variables, said method comprising:

a step of generating a subset of variables from the plurality of variables, by a variable selection module, a step of calculating a performance value for each variable of the generated subset of variables by the variable selection module, a step of selecting at least one relevant variable by applying a genetic algorithm, or by applying selection techniques, and a further step of generating a new subset of variables when the performance value of the selected variable is below a predetermined threshold value.

According to Other Optional Features of the Method, the Latter May Optionally Include One or More of the Following Features, Alone or in Combination:

the step of generating a subset of variables comprises a prior step of receiving the plurality of variables forming a representation space as a function of a determined request.

it comprises a step of verifying the relevance of identified variables, by the variable selection module, comprising assigning performance indicators.

the verification step further comprises comparing the performance indicators assigned to the identified variables with defined performance indicators.

the step of selecting at least one variable by applying a genetic algorithm comprises:

a step of calculating a fit value for each variable of the generated subset of variables, a step of generating a new variable comprising:

a step of selecting a variable from a predefined selection function, a step of transforming the selected variables according to a predefined transformation function, a step of calculating a fit value for the newly generated variable, a step of comparing the fit value of the newly generated variable with the fit values of each variable of the generated subset of variables comprising:

a further step of generating a new subset of variables when the quantitative value of the selected variable is less than a predetermined threshold value, said quantitative value corresponding to the fit value of the newly generated variable and the predetermined threshold value corresponding to the lowest fit value of the variables in the generated subset.

the step of selecting at least one variable by applying a genetic algorithm comprises beforehand:

a step of calculating the correlation between the variables of the generated subset of variables, a step of encoding the variables according to the calculated correlation between the variables of the generated subset of variables.

the step of selecting variables by applying selection techniques comprises:

selecting a univariate variable, or selecting a multivariate variable, or selecting a variable by recursive elimination.

it comprises a step of removing the variables from the generated subset of variables when the variables are redundant.

the step of assigning a performance value to each variable of the generated subset of variables, by the variable selection module, comprises classifying the variables based on the performance value.

the dataset is issued by data providers having industrial production sensors and the selected relevant variable is used by a learning model trained for monitoring an industrial process.

the industrial production sensors include: connected objects, machine sensors, environmental sensors and/or computer probes.

the industrial process is selected from: an agri-food production process, a manufacturing production process, a chemical synthesis process, a packaging process or a process for monitoring an IT infrastructure.

industrial process monitoring corresponds to industrial process security monitoring and includes in particular predictive maintenance, failure detection, fraud detection, and/or cyber attack detection.

The invention further relates to a system for identifying variables relevant to a dataset, implemented by a computing device, said variables being derived from a plurality of variables involved in processing the dataset, said system comprising a variable selection module configured to:

Generate a subset of variables from the plurality of variables involved in processing the dataset, Assign a quantization value to each variable of the generated subset of variables, Select relevant variables by applying a genetic algorithm, or by applying selection techniques, and Generate a new subset of variables when the quantitative value of the selected variable is below a predetermined threshold value.

The invention also relates to a relevant variable selection module for identifying variables relevant to a dataset, implemented by a computing device, said variables being derived from a plurality of variables involved in processing the dataset, said variable selection module being configured to:

Generate a subset of variables from the plurality of variables involved in processing the dataset, Assign a quantization value to each variable of the generated subset of variables, Select relevant variables by applying a genetic algorithm, or by applying selection techniques, and Generate a new subset of variables when the quantitative value of the selected variable is below a predetermined threshold value.

The invention further relates to a program for identifying variables relevant to a dataset implemented by a computing device, comprising instructions which, when executed by the computing device, cause a method according to the invention to be implemented.

The invention also relates to a recording medium on which the program for identifying relevant variables according to the invention is recorded.

Other advantages and features of the invention will appear upon reading the following description given by way of illustrative and non-limiting example, with reference to the appended figures.

DESCRIPTION OF THE INVENTION

Figure 1:
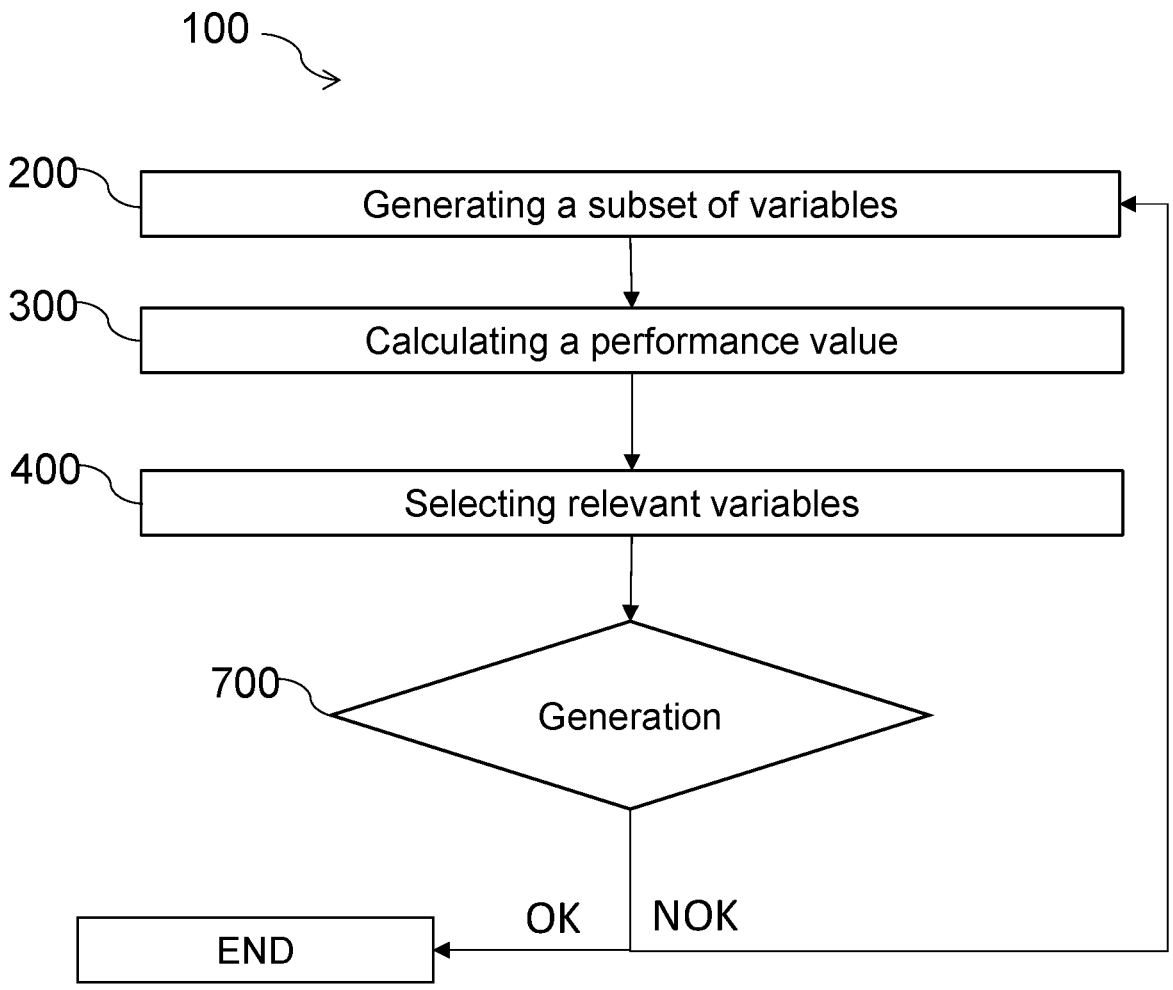
FIG. 1 shows a diagram of an embodiment of the method according to the invention.

The term "model" or "rule" or "algorithm" or "machine learning model", within the meaning of the invention, may, for example, correspond to a finite sequence of operations or instructions for calculating a value by classifying or partitioning the data within predefined groups Y and for assigning a score or ranking one or more data within a classification. The implementation of this finite sequence of operations allows, for example, to assign a label Y to an observation described by a set of characteristics or parameters X, using for example the implementation of a function f likely to reproduce Y, having observed X. $Y=f(X)+e$ where e symbolizes noise or measurement error.

By "process", "calculate", "determine", "display", "extract", "compare" or more broadly an "executable operation" is meant, within the meaning of the invention, an action performed by a device or a processor unless the context indicates otherwise. In this regard, the operations relate to actions and/or processes of a data processing system, for example a computer system or an electronic computing device, which manipulates and transforms the data represented as physical (electronic) quantities in the memories of the computer system or other devices for storing, transmitting or displaying information. These operations may be based on applications or software.

By "predetermined threshold" is meant, within the meaning of the invention, a parameter maximum value associated with each resource allowing proper operation of said resource. For example, this corresponds to the maximum acceptable resource consumption limits for an IT infrastructure hosting one or more application bricks. These limits may be real or hypothetical and generally correspond to a level of use beyond which malfunctions may occur and result in a shutdown of the resource, the IT infrastructure or at least reductions in quality of service. For example, Table 1 below shows the predetermined maximum usage thresholds for three resources.

TABLE 1

|  | CPU 1 | Network usage | Disk usage |
| --- | --- | --- | --- |
| Predetermined threshold | 80% | 350 Kbps | 60 B/s |

By "execution rules" is meant, within the meaning of the invention, predetermined parameters for the execution of a scheduling plan, compliance with which allows execution that meets the needs of the IS administrator. These rules may, in particular, include chaining orders to be respected, schedules to be respected, resource consumption thresholds to be respected, predetermined functions to be used.

By "variable" is meant, within the meaning of the invention, a characteristic of a statistical unit which is observed and for which a numerical value or a category of a classification can be assigned.

By "computing device" is meant any computing device or computing infrastructure comprising one or more hardware and/or software resources configured to send and/or receive data streams and to process them. The computing device can be a computing server.

By "Data Providers" is meant any sensors (such as industrial production sensors), probes (such as computing probes) or computer programs capable of generating industrial process monitoring data. They can also correspond to computing devices such as servers that manage data generated by sensors, probes or computer programs.

By "selection techniques" is meant, within the meaning of the invention, a finite sequence of operations or instructions allowing a value to be calculated via statistical tests such as the ANOVE test, the test of mutual information between two random variables, the Chi$^2$ test, regression tests (for example linear regression, mutual information), SVM, or recursive elimination, and allowing a set comprising relevant variables, in particular the best or most relevant variables, to be obtained.

The expression "transition to an anomaly", within the meaning of the invention, may correspond to a moment when a metric or a plurality of metrics (related or not) present a risk or a result obtained by computing, of exceeding a predetermined threshold or indicative of a risk of failure or technical incident on the IT infrastructure.

The expression "technical incident" or the term "failure", within the meaning of the invention, corresponds to a slowdown or shutdown of at least part of the IT infrastructure and its applications. A technical incident can be caused by a network error, a process failure or a failure of part of the system.

The expression "computing infrastructure", within the meaning of the invention, corresponds to a set of computing structures (that is to say computing devices) capable of running an application or an application chain. The IT infrastructure can be one or more servers, computers, or include industrial controllers. Thus, the IT infrastructure may correspond to a set of elements including a processor, a communication interface and memory.

By "probe" or "computing probe" is meant, within the meaning of the invention, a device, software or process associated with equipment which makes it possible to carry out, manage and/or feed back to computer equipment measurements of the values of performance indicators such as system parameters. This can be broadly defined as resource usage values, application runtime parameter values, or resource operating state values. A probe according to the invention therefore also encompasses software or processes capable of generating application logs or event histories ("log file" in Anglo-Saxon terminology). In addition, probes can also be physical sensors such as temperature, humidity, water leakage, power consumption, motion, air conditioning, and smoke sensors.

The expression "performance indicator" or "metric", within the meaning of the invention, corresponds to a technical or functional property of one or more elements of an IT infrastructure or its environment representing the operating conditions or state of said IT infrastructure. In addition, a performance indicator can correspond to a combination of properties or mathematical transformations of properties. For example, a performance indicator can be the derivative of a property of an IT infrastructure element or a ratio between the properties of two IT infrastructure elements.

The expression "performance indicator value" or "metric value", within the meaning of the invention, corresponds to a measurement or calculation value of a technical or functional property of one or more elements of an IT infrastructure representing the operating state of said IT infrastructure.

The term "resource", within the meaning of the invention, corresponds to parameters, capacities or functions of computing devices allowing the operation of a system or an application process. A same computing device is usually associated with several resources. Similarly, a same resource can be shared between several application processes. A resource is usually associated with a unique identifier that can be used to identify it within an IT infrastructure. For example, the term "resource" may include: network disks characterized by performance indicators such as, for example, by their inputs/outputs, reading/writing on disks, memories characterized by a performance indicator such as the usage rate, a network characterized by its bandwidth, a processor characterized for example by its usage (in percent) or the occupancy rate of its caches, a random access memory characterized by the quantity allocated. By "resource usage" is meant the consumption of a resource, for example by a business application.

The term "learning", within the meaning of the invention, corresponds to a method designed to define a function f allowing a value Y to be calculated from a base of n labeled (X1 . . . n, Y1 . . . n) or unlabeled (X1 . . . n) observations. Learning can be said to be supervised when it is based on labeled observations and unsupervised when it is based on unlabeled observations. In the context of the present invention, learning is advantageously used for calibrating the method and thus adapting it to a particular computing infrastructure.

The terms or expressions "application", "software", "program code", and "executable code" mean any expression, code or notation, of a set of instructions intended to cause a data processing to perform a particular function directly or indirectly (for example after a conversion operation into another code). Exemplary program codes may include, but are not limited to, a subprogram, a function, an executable application, a source code, an object code, a library and/or any other sequence of instructions designed for being performed on a computer system.

By "processor" is meant, within the meaning of the invention, at least one hardware circuit configured to perform operations according to instructions contained in a code. The hardware circuit may be an integrated circuit. Examples of a processor include, but are not limited to, a central processing unit, a graphics processor, an application-specific integrated circuit (ASIC), and a programmable logic circuit.

By "coupled" is meant, within the meaning of the invention, connected, directly or indirectly, with one or more intermediate elements. Two elements may be coupled mechanically, electrically or linked by a communication channel.

The expression "human-machine interface", within the meaning of the invention, corresponds to any element allowing a human being to communicate with a computer, in particular and without that list being exhaustive, a keyboard and means allowing in response to the commands entered on the keyboard to perform displays and optionally to select with the mouse or a touchpad items displayed on the screen. Another embodiment is a touch screen for selecting directly on the screen the elements touched by the finger or an object and optionally with the possibility of displaying a virtual keyboard.

The expression "connected object", within the meaning of the invention, corresponds to an electronic object connected, by a wired or wireless connection, to a data transport network, so that the connected object can share data with another connected object, a server, a fixed or mobile computer, an electronic tablet, a smartphone or any other connected device in a given network. In a manner known per se, such connected objects can be, for example, tablets, smart lighting devices, industrial tools, or smartphones.

The expression "industrial production sensors", within the meaning of the invention, may correspond to connected objects. Industrial production sensors may in particular correspond to machine sensors, dedicated to the measurement of data relating to machines, preferably production machines such as industrial machines. Thus, industrial production sensors will be able to generate data expressed as a speed (for example revolutions per minute), rate, weight or any other units useful in an industrial context. Industrial production sensors can also be environmental sensors capable of measuring temperature, pressure, humidity, for example. In particular, industrial production sensors may correspond to computing probes.

The expression "industrial process", within the meaning of the invention, may correspond to a process for the production of consumer goods, which may be, for example, electronic objects, mechanical objects, foodstuffs, or pharmaceuticals or phytopharmaceuticals. In addition, an industrial process can be controlled via an IT infrastructure. Thus, monitoring an industrial process may correspond to monitoring an IT infrastructure.

In the following description, the same references are used to designate the same elements.

As mentioned, machine learning is a major part of the fourth industrial revolution. Thus, industrial processes are more and more frequently improved through the integration of artificial intelligence or, more specifically, machine learning models capable of addressing technical problems as varied as there are industrial processes.

In particular, machine learning is based on a multitude of data that can come from several different sources and can therefore be highly heterogeneous. Thus, with the methods of the prior art, it is common for a team of data scientists to be trained in data processing and set up data processing processes. Once this data is processed, it allows the training of a learning model. Nevertheless, when data sources are diverse and vary over time, the prior art methods are not reactive and can cause shutdowns of industrial processes. Indeed, when machine learning is used for industrial process control, it is necessary to select the most relevant variables to allow the learning model to provide a relevant prediction and thus avoid negatively influencing the responsiveness of the control processes or worse a lack of sensitivity.

This can lead to risks for the industrial processes being controlled but also for the people working in contact with these industrial processes. To avoid these technical problems of shutdown of industrial processes, the inventors developed new automated processes for the continuous analysis of a dataset comprising a plurality of data subsets from the computer system used.

In particular, as will be detailed below, the inventors developed a system and a method for identifying relevant variables in a dataset including a plurality of data subsets. Advantageously, a system and a method for identifying relevant variables according to the invention will allow the relevant variables used to be constantly evaluated, adapted or replaced with variables more relevant in a particular industrial context.

Indeed, within a complex system (for example an industrial process, a set of servers, applications or equipment within a data center), some anomalies can cause serious operating problems, for example through a cascade effect. However, it is necessary to have selected variables that are always suitable, in order to avoid a degradation of the prediction of a learning model that prevents the detection of the future appearance of breakdowns or anomalies.

The invention therefore relates to a method 100 for identifying relevant variables in a dataset. In particular, the dataset can be implemented within a machine learning model that can be used for monitoring an industrial process.

In particular, as illustrated in FIG. 1 and as will be described below, the method 100 for identifying relevant variables in a dataset can be implemented by a system for identifying relevant variables for a dataset comprising a computing device with a variable selection module.

More particularly, such a method is implemented from a dataset adapted for use in the generation of a prediction model.

In addition, the method 100 for identifying relevant variables in a dataset will be able to receive (for example in response to a request) continuously a dataset, preferably preprocessed, in order to determine a subset of variables relevant to train a machine learning model for monitoring an industrial process. Preferably, in the context of a method according to the invention, the transmission of the dataset, preferably preprocessed, for identifying variables, is in real time.

Furthermore, in the context of a method according to the invention, the evaluation of the performance of the variables of the subset of variables of a dataset is preferably carried out continuously. Continuous evaluation corresponds, for example, to measurements or processing carried out at a frequency less than or equal to one hour, preferably less than or equal to 30 minutes, more preferably less than or equal to five minutes, for example less than or equal to ten seconds.

Thus, the system for identifying relevant variables for a dataset may comprise identifying relevant variables in a dataset which will allow, by means of the method according to the invention, to dynamically take into account and modify the relevant variables for establishing a prediction model.

Indeed, a method 100 for identifying relevant variables in a dataset including a plurality of data subsets is advantageously implemented by a computing device comprising a variable selection module.

The variable selection module is included in a computing device which can advantageously be adapted to be integrated into a high performance computer system or, more generally, into any system configured to generate an adapted dataset including variables allowing the behavior of a computer architecture to be interpreted and, in particular, a prediction model to be generated.

Thus, a method 100 for identifying relevant variables in a dataset according to the invention includes the steps of generating 200 a subset of variables, calculating 300 a performance value, selecting 400 at least one relevant variable and generating 700 a new subset of variables.

Figure 2:
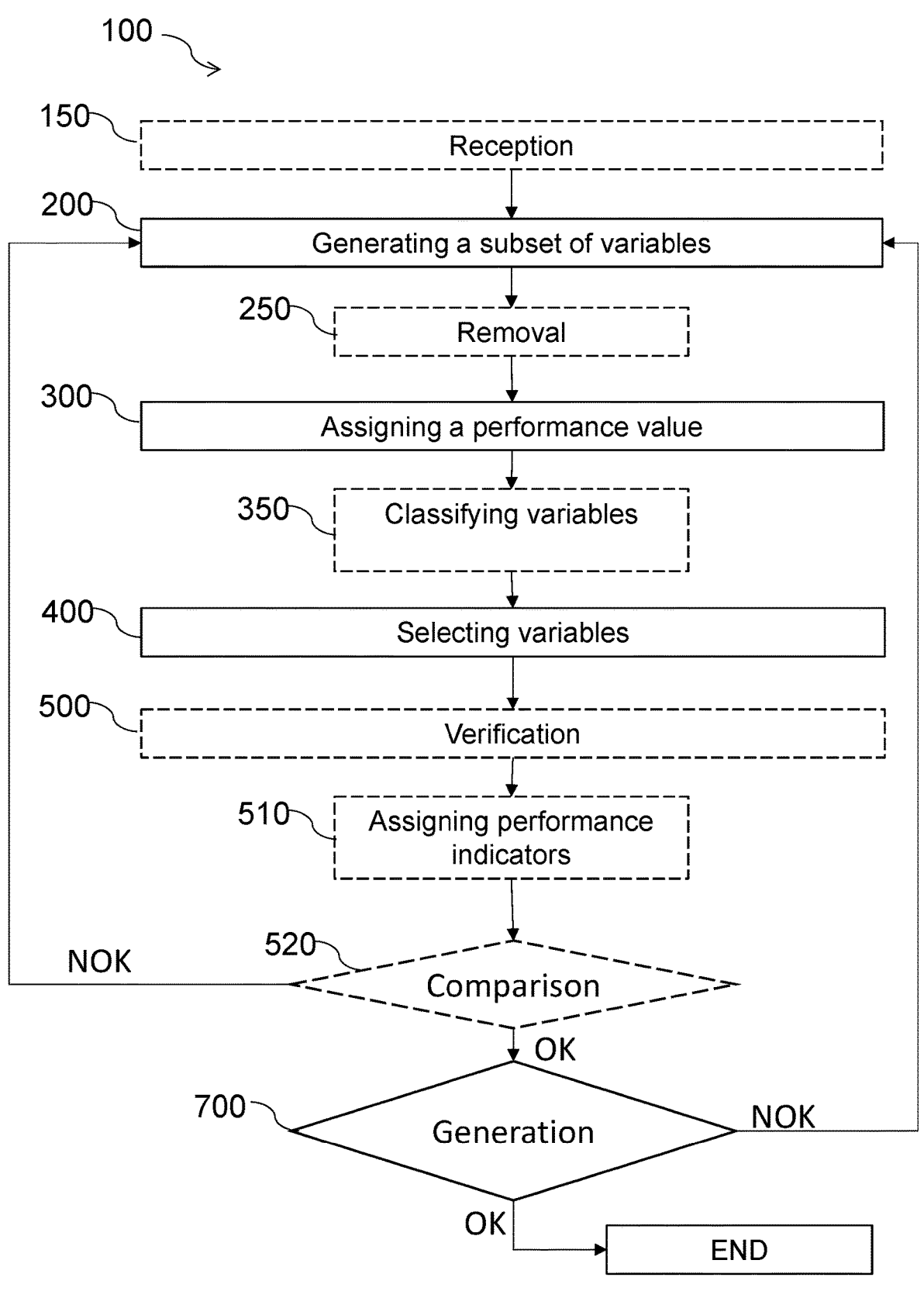
FIG. 2 shows a diagram of an embodiment of the method according to the invention.
Figure 3:
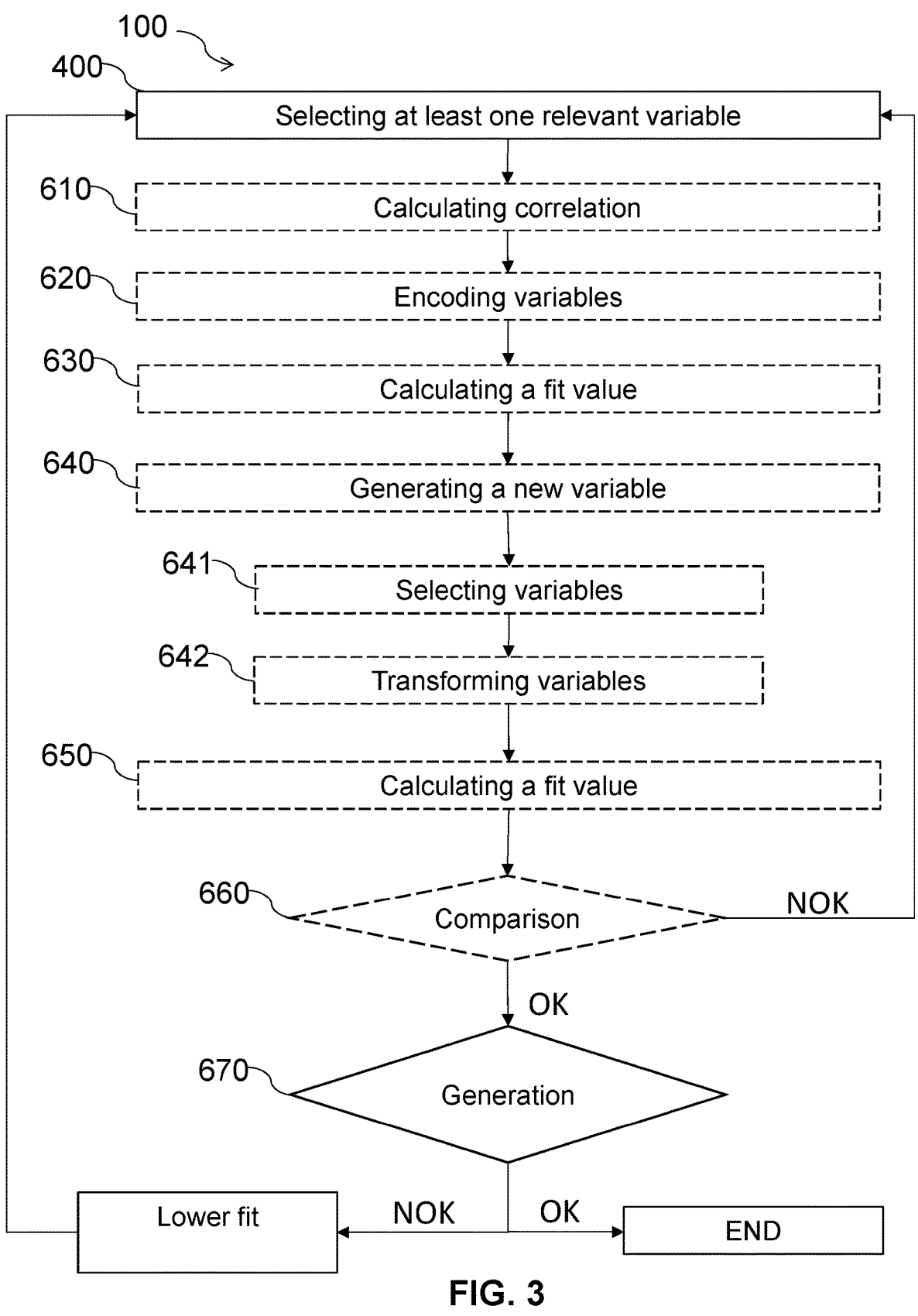
FIG. 3 shows a diagram of an embodiment of a step of the method according to the invention.
Figure 4:
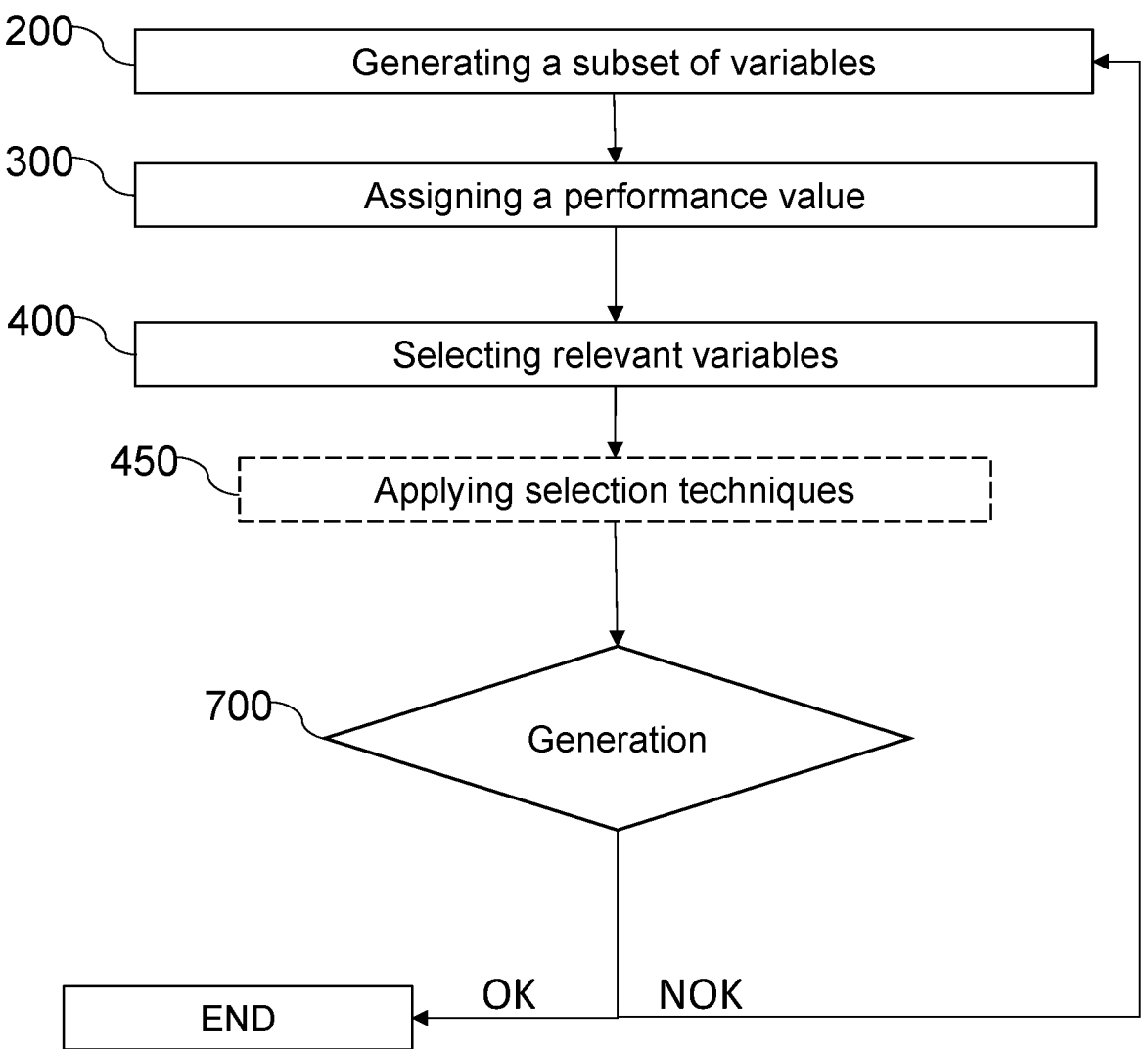
FIG. 4 shows a diagram of an embodiment of the method according to the invention.

As shown in FIG. 2, a method 100 for identifying relevant variables in a dataset may include a prior step, in the step of generating 200 a subset of variables, of receiving 150 the plurality of variables forming a representation space according to a determined request. Indeed, it is provided that the computing device comprising the variable selection module can issue requests to a computing infrastructure such as high-performance computing infrastructures, said requests being aimed at retrieving a dataset comprising a plurality of data subsets of the computer architecture.

In particular, a method 100 for identifying relevant variables in a dataset comprises a step of generating 200 a subset of variables from the set of variables, by the variable selection module.

Such a step allows a subset of variables considered by the variable selection module as relevant to be selected, from the dataset used as input and constituted by the initial set of variables forming a representation space and a training dataset for a considered problem. As described above in relation to high performance computing infrastructures, the dataset may comprise a multitude of variables describing the current state of the high-performance computing infrastructures from which it may be possible to detect a future anomaly that could lead to a disruption of the services provided by the high performance computing infrastructure.

To generate 200 a subset of variables, the variable selection module can be configured to implement a "filter" type algorithm well known to the one skilled in the art, variable selection can be seen as a search problem where each state in the representation space specifies a possible subset of variables. The transition from the initial state to the final state can be schematized by a partially ordered graph where each child state has one more attribute than its parents.

Variable selection methods use the partial order of variables to organize the search for the optimal subset of variables. This partial order corresponds to the arrangement of the variables in time, that is to say their use during the step of generating 200 a subset of variables.

For this purpose, the variable selection module can implement the well-known techniques of "forward selection", "backward elimination" or bidirectional methods.

In order to reduce the size of the data representation space and thus to optimize the cost of hardware and software resources, to reduce the time to implement the steps of the method according to the invention, the method comprises a step of removing 250 the variables of the generated subset of variables when the variables are redundant. The step of removing 250 the variables can advantageously be implemented when generating 200 a subset of variables or when selecting 400 variables.

For each subset of variables generated 200, a method according to the invention comprises a step of calculating 300 a performance value for each variable of the generated subset of variables, by the variable selection module.

For this purpose, the variable selection module is configured to implement evaluation functions for measuring the capacity of a variable or set of variables that are exogenous, that is to say not dependent on at least one other variable of the subset of variables, to distinguish between classes of the endogenous variable, that is to say from one dependent variable to at least one other variable of the subset of variables.

In order to evaluate the performance of each variable, the variable selection module can be configured to implement evaluation functions, as defined by Dash and Liu-Consistency-based search in feature selection; Elsevier, Artificial Intelligence Volume 151, Issues 1-2, December 2003, Pages 155-176, the variable selection module is thus configured to calculate performance indicators for each variable.

In addition, in order to select the most relevant variables, the step of calculating a performance value 300 of each variable of the generated subset of variables, by the variable selection module, may comprise classifying 350 the variables based on their performance value(s), such performance values may in particular correspond to:

the information criterion, describing the amount of information provided by a variable to the endogenous variable. The variable with the highest information gain will be preferred over the other variables. Information gain is the difference between a priori and a posteriori uncertainty.

the distance criterion, taking into account the discriminating power of a variable.

the independence criterion, including all measurements of correlation or association. It is used to calculate the degree to which an exogenous variable is associated with an endogenous variable.

the consistency criterion, linked to the bias of the minimum variables. These measurements look for the smallest set of variables that satisfies a user-defined minimum inconsistency percentage. Two objects are inconsistent if their modalities are identical and if they belong to two different classes. These measurements can be used to detect redundant variables.

accuracy criteria, using a classifier as an evaluation function. The classifier chooses, among all the subsets of variables, the one that gives the best predictive accuracy.

Once the variables have been evaluated, the method according to the invention comprises a step of selecting 400 at least one relevant variable by applying a genetic algorithm, or by applying selection techniques.

In fact, the variable selection module can be configured to implement one or more variable selection techniques and to select a predetermined number of variables after implementing one or more selection algorithms for each variable in the subset of variables.

By way of example, the variable selection module can be configured to implement the application 450 of selection techniques such as the following statistical testing algorithms:

Selecting 410 Univariate Variables:

By analyzing the variance or "ANOVA".

By testing the mutual information between two random variables. Mutual information measures the dependence between variables. It is equal to zero if and only if the variables are independent, and takes higher values if there is dependence. The function is based on non-parametric methods based on the entropy estimation from the distances of the K-nearest neighbors' algorithm or "K-Nearest Neighbors".

Using a $X^2$ or "Chi 2" test, which measures the dependence between stochastic variables, the use of this function "removes" the variables most likely to be independent of the variable to be predicted (classes) and therefore of little relevance for classification.

Selecting 420 Multivariate Variables:

Linear regression by calculating the correlation between each of the variables and the variable to be predicted and by converting to an F-value and then to a P-value.

Selecting 430 Variables by Recursive Elimination:

Starting from an external estimator that assigns weights to the variables (for example, the coefficients of a linear regression type model or SVM), the recursive elimination of variables consists in selecting the variables by recursively considering smaller and smaller sets of variables until having a set with k desired variables. First, the estimator is trained on an initial set of variables. The importance of each variable is obtained by means of an attribute relating either to the coefficient or to the importance of the variable itself. Then, the least important variables are eliminated from the set of variables. The process is then repeated until the elimination of the less important variables results in a set with the desired number of variables to be selected.

In addition, the step of selecting 400 at least one relevant variable may consist in applying a genetic algorithm comprising a step of generating an initial population of variables based on correlations calculated from the Pearson's coefficient or the Spearman's coefficient.

To this end, in a particular embodiment of a method according to the invention, the step of selecting 400 at least one variable by applying a genetic algorithm may comprise:

a step of calculating 630 a fit value for each variable of the generated subset of variables, a step of generating 640 a new variable comprising a step of selecting 641 a variable from a predefined selection function, a step of transforming 642 the selected variables according to a predefined transformation function, a step of calculating 650 a fit value for the newly generated variable, a step of comparing 660 the fit value of the newly generated variable with the fit values of each variable of the generated subset of variables comprising:

a further step of generating 670 a new subset of variables when the quantitative value of the selected variable is less than a predetermined threshold value, said quantitative value corresponding to the fit value of the newly generated variable and the predetermined threshold value corresponding to the lowest fit value of the variables in the generated subset. Advantageously, the step of selecting 400 at least one variable by applying a genetic algorithm may comprise beforehand:

a step of calculating 610 the correlation between the variables of the generated subset of variables, a step of encoding 620 the variables according to the calculated correlation between the variables of the generated subset of variables.

In order to ensure that the selected subset of variables comprises variables for interpreting the dataset and consequently variables suitable for generating a prediction model, a method according to the invention may comprise a step of verifying 500 the relevance of identified variables, by the variable selection module, comprising assigning 510 performance indicators. More particularly, the linear regression model used can be evaluated by determining one or more performance indicators, such as, but not limited to, the following examples:

The mean absolute error (MAE). The absolute deviation of an element in a dataset is the absolute difference between that element and a given point. As for the mean absolute deviation of a set, it is the mean (or expected value) of the absolute deviations from the mean.

The root mean squared error (RMSE) which allows the residuals between the predicted and observed values of a model or classifier to be measured. The root mean square error represents the square root of the second sampling time of the differences between predicted and observed values or the root mean square of these differences.

The coefficient of determination, noted $R^2$, which measures the quality of prediction of a linear regression.

In addition, the verification step 500 may comprise comparing 520 the performance indicators assigned to the identified variables with defined performance indicators.

In particular, the defined performance indicators may correspond to threshold values below which the identified variables of the subset of variables are considered unsuitable 520 NOK for generating a prediction model. In this case, the step of generating 200 a subset of variables is repeated.

In order to avoid obsolescence of the prediction model based on the use of previously identified relevant variables, a method 100 according to the invention comprises a further step of generating 700 a new subset of variables when the comparison of the performance value of the selected variable is below 700 NOK a predetermined threshold value. Indeed, in the context of a high performance computing infrastructure, it is frequent for it to evolve, whether by the addition of computer servers or, more generally, by the addition of hardware involving new variables having an impact on the occurrence of an anomaly, these new parameters should therefore be taken into account in order to adjust the prediction model, when the performance value of a variable deteriorates, to avoid the failure of the services provided by the high performance computing architecture.

What is claimed is:

1. A method for identifying relevant variables in a dataset including a plurality of data subsets implemented by a computing device comprising a variable selection module, each of the plurality of data subsets corresponding to a variable so as to form a set of variables, said method comprising:

issuing a request, by said variable selection module of said computing device, to a high-performance computing infrastructure to retrieve said dataset, wherein said computing device is a computing server integrated into a high-performance computer system comprising a plurality of resources including at least one of a network disk characterized by inputs/outputs and reading/writing on said network disk, a memory characterized by usage rate, a network characterized by a bandwidth, a processor characterized by a usage percentage or by an occupancy rate of caches thereof, a random access memory characterized by a quantity allocated, each associated with an industrial production sensor or computing probe, wherein the dataset is implemented within a learning model used to monitor an industrial process that produces consumer goods, said industrial process selected from an agri-food production process, a manufacturing production process, a chemical synthesis process, a packaging process, or an IT infrastructure monitoring process, wherein all of each variable of the set of variables of said each of the plurality of data subsets describe a current operating state of the high-performance computing infrastructure used to detect a future anomaly that leads to a disruption of services provided by the high-performance computing infrastructure, wherein said each variable is a statistical unit that is observed and for which a numerical value is assigned, wherein said each variable is associated with a resource of said plurality of resources of said high-performance computing infrastructure, wherein said each variable allows a behavior of the computing device to be interpreted, wherein each resource of said plurality of resources is characterized by a performance indicator, wherein said plurality of resources comprise one or more of elements and functions characterized by parameters or capacities that allow operation of said high-performance computing infrastructure or of an application process within said high-performance computing infrastructure, continuously receiving, in real time, said dataset and the set of variables from within said dataset, forming a representation space, as a function of said request, generating a subset of variables from the set of variables as identified variables of said plurality of resources, by said variable selection module, by implementing a filter-type variable selection algorithm to train said learning model to monitor said industrial process, wherein variable selection is performed as a search problem over states in the representation space, wherein each state of said states specifies a possible subset of variables and wherein transitions are schematized by a partially ordered graph;

verifying relevance of the identified variables by assigning performance indicators to said identified variables;

comparing the performance indicators that are assigned with defined performance indicators;

removing variables from the subset of variables that is generated when the variables are redundant, to reduce a size of the representation space and thereby optimize consumption of hardware and software resources and reduce time to implement the method;

continuously calculating a performance value for said each variable of the subset of variables that is generated of said each resource, by the variable selection module, classifying the variables based on the performance value that is associated therewith, wherein said performance value of said each variable corresponds to a quantitative measurement of a technical or functional property of said plurality of resources of said high-performance computing infrastructure including one or more of CPU usage, memory usage, network bandwidth consumption, disk input/output rates, and represents the current operating state of said high-performance computing infrastructure, selecting at least one relevant variable from said identified variables of said subset of variables by applying a genetic algorithm, or by applying selection techniques, using said variable selection module via a finite sequence of operations or instructions, wherein the selecting comprises calculating a correlation between the variables of the subset, encoding the variables according to the correlation that is calculated, and recursively eliminating variables based on said encoding;

training the learning model using said at least one relevant variable to detect a future appearance of a breakdown or anomaly of the high-performance computing infrastructure, wherein said selecting said at least one relevant variable allows for dynamic modification of said at least one relevant variable that is selected to generate said learning model, such that said at least one relevant variable is constantly evaluated, adapted or replaced with a variable from said identified variables relevant to a particular industrial context to monitor said industrial process, including predictive maintenance, fraud detection, or cyber-attack detection, and continuously evaluating the performance value of the at least one relevant variable that is selected during monitoring of the industrial process to determine whether the performance value associated with the at least one relevant variable satisfies a predetermined threshold, and, generating a new subset of variables, and adjusting the learning model and operating the learning model, during continued monitoring of the industrial process, using only the new subset of variables as input variables when the performance value deteriorates, wherein the at least one relevant variable previously used is replaced by variables of the new subset of variables as input, using results of the learning model operating with the new subset of variables to anticipate a future breakdown or resource requirement of the high-performance computing infrastructure; and preventing a slowdown or shutdown of services provided by the high-performance computing infrastructure based on the future breakdown or resource requirement that is anticipated to avoid obsolescence of the learning model as operating conditions of the high-performance computing infrastructure evolve, to avoid failure of services provided by the high-performance computing infrastructure, and to avoid degradation of the learning model;

wherein preventing the slowdown or shutdown comprises preventing a technical incident corresponding to a slowdown or shutdown of at least part of the high-performance computing infrastructure and its applications.

2. The method according to claim 1, wherein the selecting the at least one relevant variable by applying a genetic algorithm comprises calculating a fit value for each variable of the subset of variables that is generated, generating a new variable comprising selecting a variable from a predefined selection function, transforming the at least one relevant variable, that is selected, according to a predefined transformation function, calculating a fit value for the new variable, comparing the fit value of the new variable with all fit values of each variable of the subset of variables that is generated, comprising generating a second new subset of variables when a quantitative value of the at least one relevant variable that is selected is less than a predetermined threshold value, said quantitative value corresponding to the fit value of the new variable and the predetermined threshold value corresponding to a lowest fit value of the variables in the subset that is generated.

3. The method according to claim 1, wherein the selecting the at least one relevant variable by said applying said selection techniques comprises selecting a univariate variable, or selecting a multivariate variable, or selecting a variable by recursive elimination.

4. The method according to claim 1, wherein the industrial production sensor includes one or more of connected objects, machinesensors, environmental sensors, computing probes.

5. A system that identifies variables relevant to a dataset, implemented by a non-transitory computing device, said variables being derived from a plurality of variables involved in processing the dataset, said system comprising:

a variable selection module within the non-transitory computing device, wherein said non-transitory computing device is a computing server integrated into a high-performance computer system comprising a plurality of resources including at least one of a network disk characterized by inputs/outputs and reading/writing on said network disk, a memory characterized by usage rate, a network characterized by a bandwidth, a processor characterized by a usage percentage or by an occupancy rate of caches thereof, a random access memory characterized by a quantity allocated, each associated with an industrial production sensor or computing probe, wherein the variable selection module is implemented by said non-transitory computing device that executes a finite sequence of operations configured to issue a request to a high-performance computing infrastructure to retrieve said dataset, continuously receive, in real time, said dataset and a set of variables from within said dataset, forming a representation space, as a function of said request issued by said non-transitory computing device, wherein the dataset is implemented within a learning model used to monitor an industrial process that produces consumer goods, said industrial process selected from an agri-food production process, a manufacturing production process, a chemical synthesis process, a packaging process, or an IT infrastructure monitoring process, wherein all of each variable of the set of variables of said plurality of variables of said dataset describe a current operating state of the high-performance computing infrastructure used to detect a future anomaly that leads to a disruption of services provided by the high-performance computing infrastructure, wherein said each variable is a statistical unit that is observed and for which a numerical value is assigned, wherein said each variable is associated with a resource of said plurality of resources of said high-performance computing infrastructure, wherein said each variable allows a behavior of the non-transitory computing device to be interpreted, wherein each resource of said plurality of resources is characterized by a performance indicator, wherein said plurality of resources comprise one or more of elements and functions characterized by parameters or capacities that allow operation of said high-performance computing infrastructure or of an application process within said high-performance computing infrastructure, generate a subset of variables from the plurality of variables involved in processing the dataset as identified variables of said plurality of resources, by implementing a filter-type variable selection algorithm, to train said learning model to monitor said industrial process, wherein variable selection is performed as a search problem over states in the representation space, wherein each state of said states specifies a possible subset of variables and wherein transitions are schematized by a partially ordered graph, verify relevance of the identified variables by assigning performance indicators to said identified variable, compare the performance indicators that are assigned with defined performance indicators, remove variables from the subset of variables that is generated when the variables are redundant, to reduce a size of the representation space and thereby optimize consumption of hardware and software resources and reduce time to implement the system, continuously calculate and assign a quantitative value to said each variable of the subset of variables that is generated of said each resource, classify the variables based on the quantitative value that is associated therewith, wherein said quantitative value corresponds to a quantitative measurement of a technical or functional property of said plurality of resources of said high-performance computing infrastructure including one or more of CPU usage, memory usage, network bandwidth consumption, disk input/output rates, and represents the current operating state of said high-performance computing infrastructure, select a relevant variable from said identified variables of said subset of variables by applying a genetic algorithm, or by applying selection techniques, via said finite sequence of operations or instructions, wherein the select the relevant variable comprises calculate a correlation between the variables of the subset, encode the variables according to the correlation that is calculated, and recursively eliminate variables based on said encode, train said learning model using said relevant variable to detect a future appearance of a breakdown or anomaly of the high-performance computing infrastructure, wherein said select said relevant variable allows for dynamic modification of said relevant variable that is selected to generate said learning model, such that said relevant variable is constantly evaluated, adapted or replaced with a variable from said identified variables relevant to a particular industrial context to monitor said industrial process, including predictive maintenance, fraud detection, or cyber-attack detection, and continuously evaluate the quantitative value of the at least one relevant variable that is selected during monitoring of the industrial process to determine whether the quantitative value associated with the at least one relevant variable satisfies a predetermined threshold, and, generate a new subset of variables, and adjust the learning model and operate the learning model, during continued monitoring of the industrial process, using only the new subset of variables as input variables when the quantitative value deteriorates, wherein the at least one relevant variable previously used is replaced by variables of the new subset of variables as input, use results of the learning model operating with the new subset of variables to anticipate a future breakdown or resource requirement of the high-performance computing infrastructure; and prevent a slowdown or shutdown of services provided by the high-performance computing infrastructure based on the future breakdown or resource requirement that is anticipated to avoid obsolescence of the learning model as operating conditions of the high-performance computing infrastructure evolve, to avoid failure of services provided by the high-performance computing infrastructure, and to avoid degradation of the learning model.

6. A variable selection module that identifies variables relevant to a dataset, implemented by a computing device comprising a computing server, said variables being derived from a plurality of variables involved in processing the dataset, said variable selection module comprising:

a processor configured to be integrated into a high performance computer system comprising a plurality of resources that executes a finite sequence of operations within said computing server configured to issue a request to a high-performance computing infrastructure to retrieve said dataset, continuously receive, in real time, said dataset and the variables from within said dataset, forming a representation space, as a function of said request issued by said computing device, wherein the dataset is implemented within a learning model used to monitor an industrial process that produces consumer goods, said industrial process selected from an agri-food production process, a manufacturing production process, a chemical synthesis process, a packaging process, or an IT infrastructure monitoring process, wherein all of each variable of the variables of said plurality of variables of the dataset describe a current operating state of the high-performance computing infrastructure used to detect a future anomaly that leads to a disruption of services provided by the high-performance computing infrastructure, wherein said each variable is a statistical unit that is observed and for which a numerical value is assigned, wherein said each variable is associated with a resource of said plurality of resources of said high-performance computing infrastructure, wherein said each variable allows a behavior of the computing device to be interpreted, wherein each resource of said plurality of resources is characterized by a performance indicator, wherein said plurality of resources comprise one or more of elements and functions characterized by parameters or capacities that allow operation of said high-performance computing infrastructure or of an application process within said high-performance computing infrastructure, wherein said plurality of resources comprise at least one of a network disk characterized by inputs/outputs and reading/writing on said network disk, a memory characterized by usage rate, a network characterized by a bandwidth, a processor characterized by a usage percentage or by an occupancy rate of caches thereof, a random access memory characterized by a quantity allocated, each associated with an industrial production sensor or computing probe, generate a subset of variables from the plurality of variables involved in processing the dataset as identified variables of said plurality of resources, by implementing a filter-type variable selection algorithm to train said learning model to monitor said industrial process, wherein variable selection is performed as a search problem over states in the representation space, wherein each state of said states specifies a possible subset of variables and wherein transitions are schematized by a partially ordered graph, verify relevance of the identified variables by assigning performance indicators to said identified variables, compare the performance indicators that are assigned with defined performance indicators, remove variables from the subset of variables that is generated when the variables are redundant, to reduce a size of the representation space and thereby optimize consumption of hardware and software resources and reduce time to implement the variable selection module, continuously calculate and assign a quantitative value to said each variable of the subset of variables that is generated of said each resource, classify the variables based on the quantitative value that is associated therewith, wherein said quantitative value corresponds to a measurement of a technical or functional property of said plurality of resources of said high-performance computing infrastructure including one or more of CPU usage, memory usage, network bandwidth consumption, disk input/output rates, and represents the current operating state of said high-performance computing infrastructure, select a relevant variable from said identified variables of said subset of variables by applying a genetic algorithm, or by applying selection techniques, via said finite sequence of operations or instructions, wherein the select the relevant variable comprises calculate a correlation between the variables of the subset, encode the variables according to the correlation that is calculated, and recursively eliminate variables based on said encode, train said learning model using said relevant variable to detect a future appearance of a breakdown or anomaly of the high-performance computing infrastructure, wherein said select said relevant variable allows for dynamic modification of said relevant variable that is selected to generate said learning model, such that said relevant variable is constantly evaluated, adapted or replaced with a variable from said identified variables relevant to a particular industrial context to monitor said industrial process, including predictive maintenance, fraud detection, or cyber-attack detection, and continuously evaluate the quantitative value of the at least one relevant variable that is selected during monitoring of the industrial process to determine whether the quantitative value associated with the at least one relevant variable satisfies a predetermined threshold, and, generate a new subset of variables, and adjust the learning model and operate the learning model, during continued monitoring of the industrial process, using only the new subset of variables when the quantitative value deteriorates, wherein the at least one relevant variable previously used is replaced by variables of the new subset of variables as input, use results of the learning model operating with the new subset of variables to anticipate a future breakdown or resource requirement of the high-performance computing infrastructure; and prevent a slowdown or shutdown of services provided by the high-performance computing infrastructure based on the future breakdown or resource requirement that is anticipated to avoid obsolescence of the learning model as operating conditions of the high-performance computing infrastructure evolve, to avoid failure of services provided by the high-performance computing infrastructure, and to avoid degradation of the learning model.

7. The method according to claim 1, wherein the performance value comprises a performance indicator value corresponding to a measurement or calculation value of the technical or functional property of one or more elements of an IT infrastructure representing an operating state of the IT infrastructure.

8. The method of claim 1, wherein the defined performance indicators correspond to threshold values below which one or more variables are determined to be unsuitable for generating the learning model, and wherein generating the subset of variables is repeated when the one or more variables are determined to be unsuitable.

9. The method of claim 1, wherein verifying relevance of the identified variables includes evaluating a regression of the learning model using at least one performance indicator selected from a mean absolute error (MAE), a root mean square error (RMSE), and a coefficient of determination ($R^2$).

10. The method of claim 1, wherein calculating the correlation between the variables comprises calculating correlation using at least one of a Pearson correlation coefficient and a Spearman correlation coefficient.

11. The method of claim 1, wherein the partially ordered graph schematizes transitions between the states such that each transition corresponds to adding at least one variable to a current state to form a child state specifying a different subset of variables, wherein each child state has one more attribute than its parent state.

\* \* \* \* \*